Jan. 27, 1959
B. F. VOIGT
2,870,878
AUTOMATIC CLEARANCE SETTER
Filed July 22, 1955
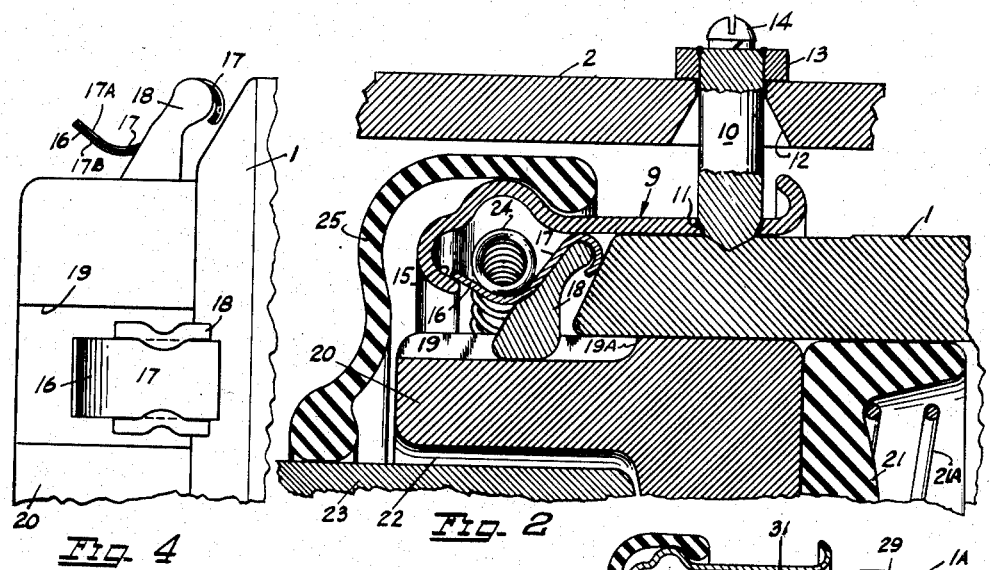
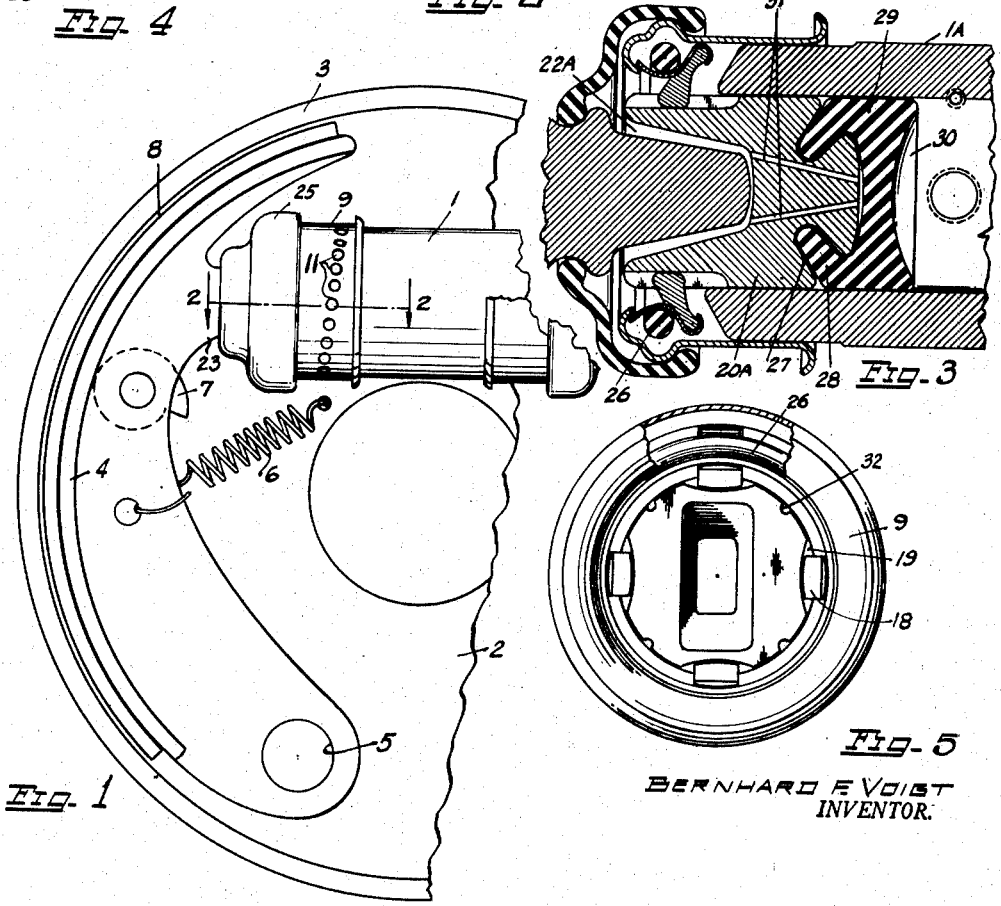
BERNHARD F. VOIGT
INVENTOR.

United States Patent Office 2,870,878
Patented Jan. 27, 1959

2,870,878

AUTOMATIC CLEARANCE SETTER

Bernhard F. Voigt, Corvallis, Oreg.

Application July 22, 1955, Serial No. 523,811

4 Claims. (Cl. 188—196)

This invention relates to automatic clearance setting devices, integrated with or about the operative means of a friction driven or retarded, grinding, or cutting machine wherein the loss of material from application and/or release tends to cause an increasing clearance between stationary, sliding or revolving parts thereof; to automatically restrict the aforesaid clearance to a predetermined value; to means of setting said value; and to means of determining a range over which said automatically restricted clearance be maintained.

Unless other means of take-up be interposed between the point of operation of an automatic clearance setter and the operating lever of its machine, the operating lever will advance its application point proportionally with an operational loss of material. Manifestly, said take-up must bear the force applied to the operation. A follow-up by automatic take-up of automatic clearance setting is often desired. Many forms thereof have been proposed and used. A most common one is available in hydraulic transmission systems in which a fluid pressure generator includes means of supercharging, that is, adding additional fluid ahead of its piston. This is readily accomplished by valving the piston; fluid inertia and a two-way foot valve deferring a return of fluid displaced during application when said application is quickly released; fluid flowing around said piston; and said excess fluid returned to the reservoir through a so-called compensating port uncovered by said valved piston upon the complete release of a prior application. A fluid pressure generator of this description is commonly called a compensating master cylinder. However, only by overcoming the foot valve can fluid be added to the system and negative pressures be developed therein.

The invention is hereinafter shown and described as one of its uses in connection with a hydraulically operated automotive brake system including a master cylinder, wherein by providing an automatic clearance setter, the necessity of periodic readjustment for brake lining wear is eliminated; and by said automatic clearance setter maintaining a constant point of application, greatly increased mechanical advantage in operational leverage with increasing mechanical advantage with increasing application may be obtained provided air be kept out of the system.

The invention is more specifically shown and described incorporated about the piston of a wheel cylinder such as is commonly used in a hydraulic brake system, and may be incorporated therewith without requiring any alteration of presently used brake shoes, anchorage or backing plate, and as fully enclosed and protected in its operation as the original wheel cylinder.

Further objects of the invention are:

To provide a wear-limit warning device which will permit the clearance to increase with further wear after the brake lining has reached the predetermined thinness, thus giving warning without impairment of braking ability.

To provide a means of releasing accumulated take-up and unlocking means to permit removal of brake drums when the drums and linings have worn overlapping concentric lands and grooves; and to provide means for rendering the invention operative or inoperative at will, as when aligning the brake shoes in relation to the brake drum.

To provide a mechanism which is shock-proof and vibration-proof and subjected only to the force of the brake return spring and not to any braking force and therefore cannot interfere with braking action.

These and other objects will appear as my invention is more fully hereinafter described in the following specification, illustrated in the accompanying drawings, and finally pointed out in the appended claims.

In the drawing:

Figure 1 is a fragmentary side view of a wheel cylinder or motor made in accordance with my invention and operatively connected to a brake shoe, brake drum and backing plate assembly.

Figure 2 is an enlarged fragmentary sectional view taken approximately along the line 2—2 of Figure 1.

Figure 3 is a view similar to Figure 2 illustrating a modified form of piston and sealing cup and resilient circumscribing element.

Figure 4 is a fragmentary top plan view of Figure 2 with parts omitted for convenience of illustration and showing a modified form of regulating levers.

Figure 5 is an end view of Figure 3 with the protective hood and brake shoe extension removed and a fragment of a regulating sleeve broken away.

Referring more particularly to the drawing:

In Figure 1 I have shown my hydraulic brake cylinder, indicated by reference numeral 1, secured in any approved manner to a conventional backing plate 2 associated with a brake drum 3. The cylinder is operatively connected to a brake shoe 4 which is pivotally attached as at 5 to the backing plate in the conventional manner and normally held in a retracted or brake-off position by the usual tension spring 6. The backing plate is provided with the usual clearance adjustment cam 7 for manually setting the clearance indicated at 8 between the lining of the brake shoe and the brake drum.

As best illustrated in Figure 2, my invention includes a cylindrical regulating sleeve generally indicated at 9 and made longitudinally adjustable to and affixed upon the cylinder 1 by a locking pin 10 engageable at one of its ends with spirally arranged apertures 11 formed in the sleeve. The locking pin extends through an opening 12 in the backing plate and is joined by welding or the like to a covering plate 13 and is therewith mounted on the backing plate by means of screws 14. The outer end of the regulating sleeve is turned back inwardly as shown to provide a cam surface 15 for the outer ends 16 of regulating levers 17 secured by any suitable means, such as crimping or the like, to front and top surfaces of regulating cams 18 whose slightly curved bottoms are normally in operative contact with slots or channels 19 milled into or otherwise extended longitudinally inward to form termini 19A on the periphery of a connecting rod or piston 20 at a point thereon in spaced relations proportional to a predetermined operational loss of material. A sealing cup 21 backing the piston prevents fluid leakage from the cylinder within which both are slidably mounted by a working fit and urged outward by the sealing cup's positioning spring 21A and fluid pressure within the cylinder. The piston is centrally bored inward from its outer end as at 22 for operative engagement with the usual arm or projection 23 formed on the flange of the brake shoe. The brake return spring maintains the projection seated within the bore and an urge counter to outward piston movement. The regulating levers 17 whose inner ends are turned downwardly about the top ends of the regulating cams are surrounded by an endless coil spring 24 positioned to normally hold the regulating cams in frictional engagement with the channels 19 and to tilt them on their slightly curved bottoms to normally maintain the tops of the regulating levers 17 in light contact with the inner periphery of the regulating sleeve 9. The piston, regulating cams and levers, and the outer end of the regulating sleeve are protectively enclosed by a flexible boot 25.

From the foregoing and the drawing it will be seen that my invention surrounds a rod or piston connecting a source of controlled pressure to cooperating elements, and that the cams and levers and their circumscribed spring will, through frictional engagement with the piston, move therewith until in outward movement, as when applying a brake such as described, the outer ends of the regulating levers contact and endeavor to mount the inwardly turned cam surface of the regulating sleeve and thereby free themselves and the cams from further outward movement with the piston and that upon the release of such a brake as described the cams frictionally reengage the piston to move inwardly therewith until stopped by a movement limiting device such as a guide or cylinder about the piston or connecting rod. Assisted by a slight springing of the inner ends of the regulating levers, the cams will tilt about their points of contact on bottom surfaces of the channels and be pressured against the inner surface of the regulating sleeve to lock the piston against further inward movement. Regulating levers composed of laminated strips of unlike thermo-expansion coefficients, as indicated at 17A and 17B in Fig. 4, neutralize any thermo variation by their inherent self-compensating curvatures.

Accordingly the extent of the cams free travel in frictional embracement with the piston is predetermined by positioning the regulating sleeve, and is proportional in spaced relations to corresponding operational clearances between cooperating elements, or in other words and as depicted, a same predetermined clearance between the lined brake shoe and its drum follows every complete release of its application thereto (the piston advances through the cams during an application to compensate for any operational loss of material however small it may be, and the cams by their locking action following the complete release of each application take up and collect these compensating movements) until the cams are contacted by their respective channels' termini whereupon prior compensating aggregate will continue to be held but cannot be further accumulated. Accumulated take-up may be manually released by withdrawing the locking pin 10 and forcing the regulating sleeve to the right as viewed in the drawing to release the cams from their embrace with the piston and in an extreme case where lands and grooves have been worn into the drum and shoes so as to be interlocked thereby to prohibit a lateral movement necessary for disassembly, a common tool inserted in the opening 12 effects a lever to pry against the regulating sleeve as and with aforesaid effect.

The conventional wheel cylinder sealing cup depicted in Figure 2, when subjected to an inverse pressure which may develop; if a large drop in fluid temperature occurs, if the brake shoes are mechanically spread as in adjusting by manual or automatic means for operational loss of material, if an overrunning parking brake linkage (not shown) is utilized, or the like whereby the piston correspondingly moves outward solely under the urge of its cup positioning spring, may permit air to leak into and contaminate the fluid. As depicted in Figure 3, in which to simplify the drawing I replace the coil spring 24 with an endless elastic band 26, in order to maintain two-way sealing with a simple sealing cup I undercut the inner end of the piston to provide a tapering groove 27 to receive the skirt 28 portion of a cup 29 whose outer face is of annularly concaved formation as indicated at 30 and whose peripheral surface remains in contact with the walls of the cylinder 1A at all times and presses more fully thereto the more fluid pressure within the cylinder endeavors to move the cup outward and consequently endeavors to expand the cup. Air bleeder ducts 31 extend through the piston from the bore 22A and afford open communication to the slight space between the innermost end of the piston and the adjacent surface of the cup so that air will be fed to said space upon the development of a relatively negative fluid pressure within the cylinder to slightly deform the concave face of the cup and thereby increase the pressure of its peripheral surface against the cylinder wall. Upon restoration of normally positive fluid pressure within the cylinder the cup will be returned thereby to its normal shape, the air being forced outwardly through the ducts 31 and also from around the cup and out through small grooves 32 formed in the periphery of the piston parallel to the longitudinal axis thereof.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

1. A device for automatically setting predetermined clearance between cooperating elements of a machine which are subject to an operational loss of material and thereby increasing clearances between said cooperating elements upon the operational separation thereof, and normally provided with means of compensation upon readjustments of said clearances, said device comprising a piston operatively disposed within a guide and between a source of controlled pressure and one of said cooperating elements, said piston having longitudinal channels formed therein, an annular cam surface surrounding said piston adjustable axially thereof and in spaced relation to the adjacent end of said guide, spring urged cam elements operable within said channels and engageable with said annular cam surface upon outward movement of the piston to tilt the cam elements in one direction to permit freedom of such movement of the piston and said cams being tiltable in an opposite direction by contact with said adjacent end of the guide upon movement of the piston in an opposite direction to thereby lock the piston against further inward movement, whereby said outward movements of the piston will accumulate and their aggregate will equal that necessary to compensate for all operational loss of material and to maintain predetermined space relations between said cooperating elements regardless of any change in shape incidental to said loss of material.

2. A clearance setter of the class described comprising a cylinder, a piston slidably mounted within the cylinder and adapted for the transfer of pressures outwardly from a controlled source to an actuating lever of a machine, said piston having longitudinal channels formed therein, a regulating sleeve surrounding the cylinder and axially adjustable thereon, internal cam surfaces formed on the outer end of said sleeve in spaced relation to the adjacent end of said cylinder, a plurality of regulating cams operatively disposed in said channels of the piston, regulating levers secured between their ends to said regulating cams and arranged at their outer ends for engagement with said cam surface in the regulating sleeve during outward movement of the piston to permit freedom of such movement of the piston, a circumscribing spring embracing all of said regulating levers for maintaining the inward ends of the cams in contact with the bottom surfaces of the channels and for assisting in tilting the cams in an opposite direction when contacting said adjacent end of the cylinder upon movement of the piston in an opposite direction to thereby lock the piston against further inward movement whereby the extent of movement of the cams with the piston and the proportional corresponding spaced relations between said cooperating elements of the machine will be as predetermined by the positioning of said sleeve upon said cylinder.

3. A device for automatically setting predetermined clearances between cooperating elements of a machine in which said elements are subjected to an operational loss of material and thereby increasing clearance therebetween upon their operational separation, said device comprising a piston operatively disposed within a guide or cylinder and between a source of controlled pressure and one of said cooperating elements, said piston having longitudinal channels formed therein extending inwardly toward said controlled source of pressure and terminating at a point in spaced relation proportional to a predetermined operational loss of material, an annular cam surface surrounding said piston and adjustable axially relative thereto, spring urged cam elements surrounding and in contact with the piston and engageable with said annular cam surface upon outward movement of the piston to permit freedom of such movement of the piston and tiltable with respect to the cam surface and the piston to lock the piston against inward movement, whereby the aggregate of thus accumulated outward movements equals that necessary to compensate for said operational loss of material between said cooperating elements and to maintain a predetermined clearance therebetween upon their operational separation until cam elements contact the terminal ends of channels, whereupon said aggregate of outward movements of the rod will continue to be held but cannot further be accumulated.

4. A device for automatically setting predetermined clearances between cooperating elements of a hydraulically pressured motor operatively disposed in a hydraulic transmission system providing hydraulically pressured means of compensation for operation loss of material, said device comprising a piston operatively disposed within a cylinder and between a source of hydraulic pressure and one of said cooperating elements, said piston having longitudinal channels formed in its peripheral surface and extending outwardly from their points of origin to the outer end of the piston, a regulating sleeve surrounding the cylinder and axially adjustable thereon, the outer end of the sleeve terminating in a cam surface in adjustable spaced relation to the adjacent end of the cylinder, a plurality of regulating cams operatively disposed within said channels of the piston, regulating levers secured between their ends to said regulating cams and arranged at their outer ends for engagement with said cam surface in the regulating sleeve during outward movement of the piston for tilting said regulating cams in one direction to permit of such movement of the piston, a circumscribing spring embracing all of said regulating levers for maintaining the inward ends of the cams in contact with the bottom surfaces of the channels and for assisting in tilting the cams in an opposite direction when the outer ends of said regulating levers become disengaged from said cam surface and their opposite ends contact said adjacent end of said cylinder to thereby lock the piston against further inward movement, whereby the extent of movement of the cams with the piston between said limits and the proportional corresponding spaced relations between said cooperating elements will be as predetermined by the positioning of said sleeve along said cylinder and by the location of the points of origin of said channels.

References Cited in the file of this patent
UNITED STATES PATENTS
2,587,832    Frick  ---------------- Mar. 4, 1952